(12) United States Patent
Wang et al.

(10) Patent No.: US 9,727,556 B2
(45) Date of Patent: Aug. 8, 2017

(54) SUMMARIZATION OF A DOCUMENT

(71) Applicant: Hewlett-Packard Development Company, L.P., Fort Collins, CO (US)

(72) Inventors: Lei Wang, Beijing (CN); Xun Wang, Beijing (CN); Min Wang, Palo Alto, CA (US); Tong Zhang, Palo Alto, CA (US); Bin Bai, Beijing (CN)

(73) Assignee: EntIT Software LLC, Sunnyvale, CA (US)

( * ) Notice: Subject to any disclaimer, the term of this patent is extended or adjusted under 35 U.S.C. 154(b) by 0 days.

(21) Appl. No.: 14/438,386

(22) PCT Filed: Oct. 26, 2012

(86) PCT No.: PCT/CN2012/083588
§ 371 (c)(1),
(2) Date: Apr. 24, 2015

(87) PCT Pub. No.: WO2014/063354
PCT Pub. Date: May 1, 2014

(65) Prior Publication Data
US 2015/0293905 A1     Oct. 15, 2015

(51) Int. Cl.
*G06F 17/27* (2006.01)
*G06F 17/28* (2006.01)
(Continued)

(52) U.S. Cl.
CPC .......... *G06F 17/28* (2013.01); *G06F 17/2785* (2013.01); *G06F 17/30707* (2013.01); *G06F 17/30719* (2013.01); *G06N 5/022* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 6,556,983 B1 * 4/2003 Altschuler ........ G06F 17/30958
706/11
7,430,504 B2 9/2008 Vanderwende et al.
(Continued)

FOREIGN PATENT DOCUMENTS

CN          1828609 A      9/2006
CN        101382962 A      3/2009
(Continued)

OTHER PUBLICATIONS

International Search Report and Written Opinion of the International Searching Authority, mailed Aug. 1, 2013, issued in related PCT Application No. PCT/US2012/083588.
(Continued)

*Primary Examiner* — Lamont Spooner

(57) ABSTRACT

A method for summarizing a document is provided. A concept is detected for each sentence in said document. Relevance measures between the sentences are computed according to the detected concepts. And then a concept-aware graph is constructed, wherein a node in said graph represents a sentence in the document and an edge between two nodes represents a relevance measure between these two sentences.

16 Claims, 4 Drawing Sheets

(51) Int. Cl.
*G06F 17/30* (2006.01)
*G06N 5/02* (2006.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2795
USPC .................................................. 704/1, 9, 10
See application file for complete search history.

(56) References Cited

U.S. PATENT DOCUMENTS

| | | | |
|---|---|---|---|
| 7,835,578 B2 | 11/2010 | Cheng et al. | |
| 2001/0016809 A1 | 8/2001 | Ishikawa et al. | |
| 2002/0078090 A1 | 6/2002 | Hwang | |
| 2002/0078091 A1 | 6/2002 | Vu | |
| 2005/0091038 A1* | 4/2005 | Yi | G06F 17/2715 704/10 |
| 2005/0210008 A1* | 9/2005 | Tran | G06F 17/30864 |
| 2005/0210009 A1* | 9/2005 | Tran | G06Q 10/10 |
| 2005/0278325 A1* | 12/2005 | Mihalcea | G06F 17/277 |
| 2006/0112134 A1* | 5/2006 | Tsuboi | G06F 17/277 |
| 2008/0270116 A1* | 10/2008 | Godbole | G06F 17/279 704/9 |
| 2009/0048823 A1* | 2/2009 | Liu | G06F 17/2765 704/9 |
| 2011/0078167 A1* | 3/2011 | Sundaresan | G06F 17/2785 707/765 |
| 2011/0184729 A1* | 7/2011 | Nam | G06F 17/2755 704/9 |
| 2011/0218947 A1 | 9/2011 | Vadlamani et al. | |
| 2011/0218960 A1* | 9/2011 | Hatami-Hanza | G06F 17/30 707/603 |
| 2012/0056901 A1 | 3/2012 | Sankarasubramaniam et al. | |
| 2012/0259616 A1* | 10/2012 | Peng | G06F 17/274 704/9 |
| 2013/0103386 A1* | 4/2013 | Zhang | G06F 17/2785 704/9 |
| 2014/0195897 A1* | 7/2014 | Balinsky | G06F 17/30719 715/254 |

FOREIGN PATENT DOCUMENTS

| | | |
|---|---|---|
| CN | 102163215 | 8/2011 |
| JP | 2011028638 A | 2/2011 |

OTHER PUBLICATIONS

Morales, L.P. et al, "Concept-graph Based Biomedical Automatic Summarization Using Ontologies", Aug. 2008.
Patil, K et al, "Sumgraph: Text Summarization Using Centrality in the Pathfinder Network", 2007.
Wang, Meng et al, An Approach to multi-document summarization based on concept co-Occurrence Models, Computer Engineering & Science, V. 33(7), pp. 188-192, Jul. 2011.
European Search Report cited in EP12887144; mailed May 12, 2016; 7 pages.
D. Zhou, J. Weston et al; Ranking on data manifolds; In Proceedings of NIPS 2003; (https://papers.nips.cc/paper/2447-ranking-on-data-manifolds.pdf); 2003; 8 pages.
David Milne et al; Learning to Link with Wikipedia; CIKM'08, Napa Valley, California, USA; https://pdfs.semanticscholar.org/07ab/d02f02774d178f26ca99937e5f94001a9ec9.pdf; Oct. 26-30, 2008; 10 pages.
J.M. Kleinberg; Authoritative sources in a hyperlinked environment; Journal of the ACM, 46(5):604-632.; (http://www.cs.cornel.edu/home/kleinber/auth.pdf); 1999; 34 pages.
NIST; Text Analysis Conference; http://www.nist.gov/tac/; Aug. 31, 2016; 1 page.
S. Erin and L Page; The anatomy of a large-scale hypertextual Web search engine; Computer Networks and ISDN Systems, 30(1-7); (http://ilpubs.stanford.edu:8090/361/1/1998-8.pdf); 1998; 20 pages.
Spärck Jones. Karen; A statistical interpretation of term specificity and its application in retrieval; Journal of Documentation 28 (1): 11-21; https://ai2-s2-pdfs.s3.amazonaws.com/4f09/e6ec1b7d4390d23881852fd7240994abeb58.pdf; 1972; 9 pages.
Yihong Gong and Xin Liu; Generic text summarization using relevance measure and latent semantic analysis; In Proceedings of the 24th annual international ACM SIGIR conference on Research and development in information retrieval (SIGIR '01). ACM; New York, NY, USA, 19-25;(http://www.cs.bham.ac.uk/~pxt/IDA/text_summary.pdf); 2001; 7 pages.

* cited by examiner

SUMMARIZATION OF A DOCUMENT

BACKGROUND

With the development of information technology and networks such as Internet and intranets, more and more information exists online. The vast amount of online information may overwhelm a user who wants to find something that might be of interest to him. Hence, more attention has been paid to filtering out unnecessary information and receiving only the information needed. One method useful for such purposes is providing a summary of a document or summarizing a document so that the user may be allowed to preview the summary and decide whether it would be worthwhile to acquire and read the full document.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

Automatic summarization has long been an important task for natural language processing. A good summary of a document should be concise and accurate, in other words, capable of capturing the important information of the source documents. Until now, various kinds of methods have been proposed. Broadly, there are two kinds of approaches for summary generation: extraction and abstraction. Extraction methods focus on selecting sentences from a single document or multiple documents while abstraction methods generate new sentences by employing various technologies of paraphrasing.

As used in this disclosure, a "document" refers to any body of free, unstructured or semi-structured text. The text can include the entire content of a document in its general sense, such as a book, an article, a paper, or the like- or a portion of a traditional document, such as an abstract, a paragraph, a sentence, or a phrase, for example, a title. Ideally, a "document" describes a coherent topic. Thus, throughout this disclosure, the term "document" is used broadly to signify a unit of text data, which is inclusive of merely a portion of a document, such as a section, or a paragraph. In addition, a "document" can encompass text generated from an image or other graphics, as well as text recovered from audio or video formats. A document generally can include a number of sentences. Similarly, the word "term" is used broadly throughout this disclosure to signify a word or a grouping of words that is topically related to a document, or a document collection.

In the following, certain examples according to the present disclosure are described in detail with reference to the drawings.

Figure 1:
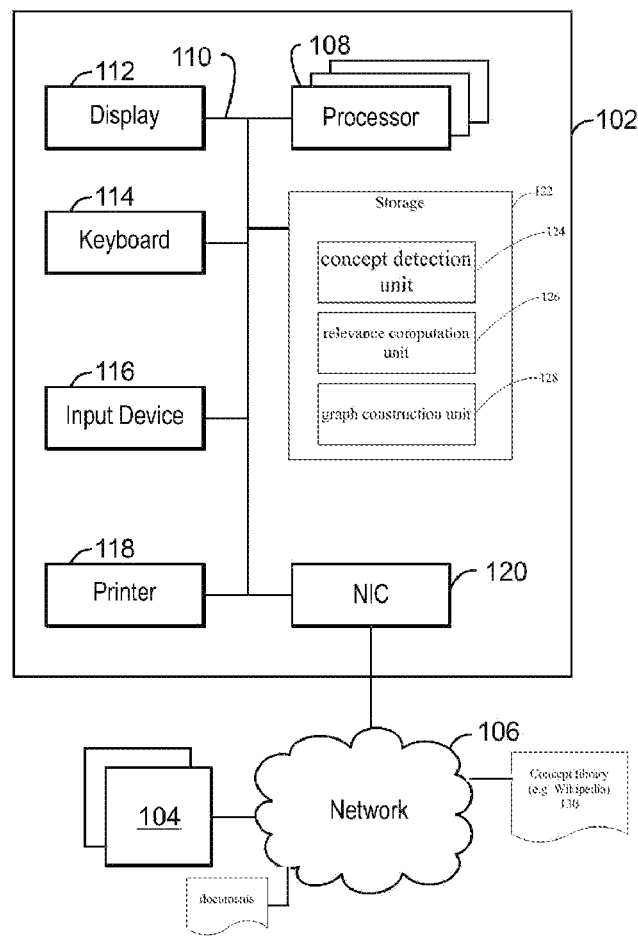
FIG. 1 is a block diagram of a system that may summarize a document according to an example of the present disclosure.

With reference to FIG. 1, FIG. 1 is a block diagram of a system that may summarize a document according to an example of the present disclosure. The system is generally referred to by the reference number 100. Those of ordinary skill in the art will appreciate that the functional blocks and devices shown in FIG. 1 may comprise hardware elements including circuitry, software elements including computer code stored on a tangible, machine-readable medium, or a combination of both hardware and software elements. Additionally, the functional blocks and devices of the system 100 are but one example of functional blocks and devices that may be implemented in an example. Those of ordinary skill in the art would readily be able to define specific functional blocks based on design considerations for a particular electronic device.

The system 100 may include a server 102, and one or more client computers 104, in communication over a network 106. As illustrated in FIG. 1, the server 102 may include one or more processors 108 which may be connected through a bus 110 to a display 112, a keyboard 114, one or more input devices 116, and an output device, such as a printer 118. The input devices 116 may include devices such as a mouse or touch screen. The processors 108 may include a single core, multiple cores, or a cluster of cores in a cloud computing architecture. The server 102 may also be connected through the bus 110 to a network interface card (NIC) 120. The NIC 120 may connect the server 102 to the network 106.

The server 102 can access to various documents through the network 106 and the input device 116. For example, a user may input a document(s) for which a summary is to be generated through the input device 116. Or the server 102 can search for a number of documents from the Internet by using some searching engines like Google. The server 102 also has access to a concept library 130. The concept library 130 can be but not limited to some publicly available concept libraries such as Wikipedia, Baidu Baike, BabelNet, etc. A user can also define his own concept library. In the following description, Wikipedia will be used as an example for illustration. However, those skilled in the art will appreciate that Wikipedia only serves as an example and the present invention is not limited in this regard. Noted that Wikipedia contains more than 350 million manually edited concepts and a Wikipedia concept is represented as a article page in Wikipedia.

The network 106 may be a local area network (LAN), a wide area network (WAN), or another network configuration. The network 106 may include routers, switches, modems, or any other kind of interface device used for interconnection. The network 106 may connect to several client computers 104. Through the network 106, several client computers 104 may connect to the server 102. The client computers 104 may be similarly structured as the server 102.

The server 102 may have other units operatively coupled to the processor 108 through the bus 110. These units may include tangible, machine-readable storage media, such as storage 122. The storage 122 may include any combinations of hard drives, read-only memory (ROM), random access memory (RAM), RAM drives, flash drives, optical drives, cache memory, and the like. Storage 122 may include a concept detection unit 124, a relevance computation unit 126 and a graph construction unit 128. The concept detection unit 124 may detect a concept(s) in a sentence of a document. A concept in a sentence is defined as words and phrases that present some semantics of the sentence. The concept detection unit 124 can detect concepts in each and every sentence of the document. The relevance computation unit 126 can compute relevance measures between the sentences according to the concepts detected in these sentences. The graph construction unit 128 can construct a concept-aware graph based on the computed relevance measures, wherein a node in said concept-aware graph represents a sentence in the document and an edge between two nodes represents a relevance measure between these two sentences.

Although not shown in FIG. 1, the storage 122 can also include some other units, such as a preprocessing unit, a ranking unit and a summary generating unit. The preprocessing unit can perform some preprocessing on the target document. For example, said preprocessing can include removing illegal characters from a sentence, e.g. Chinese characters in an English article might be considered as illegal characters and should be removed. The preprocessing can also include removing words like interjection from a sentence because these words normally do not contribute to the meaning of a sentence. Of course, there could be some other types of preprocessing, which will not be described in detail herein. The ranking unit may run a ranking method on the concept-aware graph constructed by the graph construction unit 128 and give a score to each sentence (i.e. ranking). The higher a score of a sentence is, the more important the sentence is. In this way, all the sentences in a document can be sorted according to their scores. Examples of the ranking method can include but not limited to HITS Rank, Google's PageRank and manifoldrank. After each sentence is scored by the ranking unit, sentences can be selected in order according to their ranks. The summary generating unit can choose the top ranking sentences as a summary for the document. According to an example of the present disclosure, when a sentence is selected, this sentence can be compared with already selected sentences to check whether this sentence is too close or similar to one of the already selected sentences. If they are too similar, this sentence will not be selected into the summary (i.e. selecting those sentences that are not similar but important). The generated summary can be displayed on the display 112 for view by the user or sent to the printer 118 to be printed.

Figure 2:
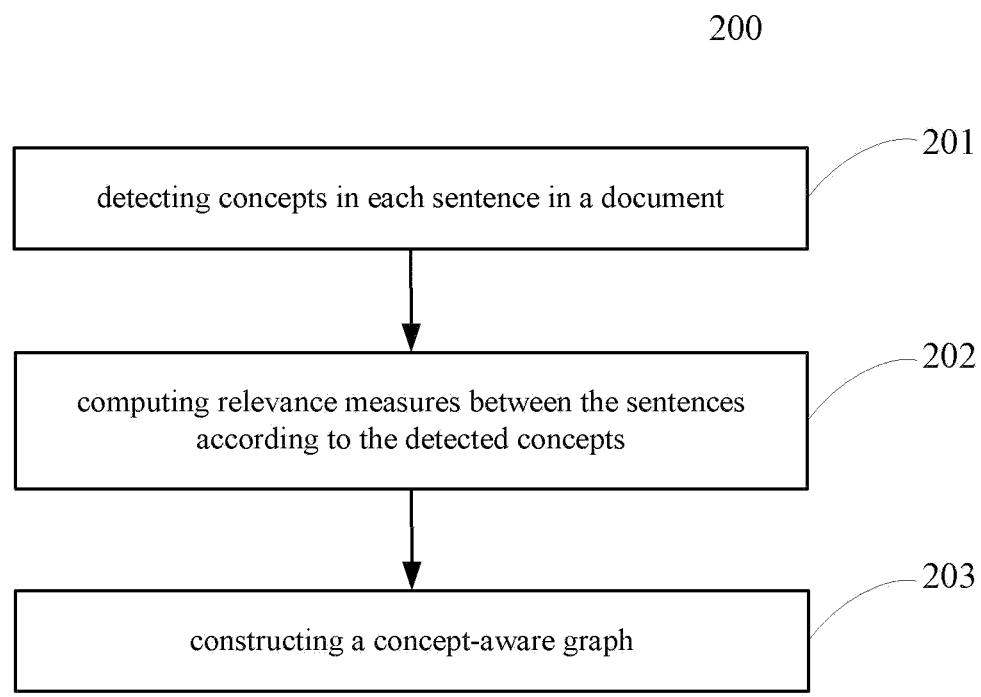
FIG. 2 is a process flow diagram for a method of summarizing a document according to an example of the present disclosure.

With reference to FIG. 2 now, FIG. 2 illustrates a process flow diagram for a method of summarizing a document according to an example of the present disclosure. The method is generally referred to by the reference number 200. At block 201, a concept(s) is detected for each sentence in a document. According to an example of the present disclosure, a concept in a sentence is detected based on a predefined concept library, which comprises a number of reference concepts. For example, said predefined concept library can be but not limited to Wikipedia and each Wikipedia page is a reference concept. Thus, in this example, Wikipedia is used as an ontology to detects concepts that are used to express the original sentences. According to an example, detecting a concept in a sentence involves two aspects. First, concepts candidates are obtained for a term in a sentence by simple matching. That is, the term is compared with an article name of a Wikipedia page to see if they match with each other. If they match, then this Wikipedia page (i.e. a Wikipedia concept) is a candidate concept for this term. Then, an operation of disambiguation can be performed over those candidate concepts to get the most similar Wikipedia concept for each term, because a term can have multiple meanings and cause ambiguity. For example, from a sentence of "iphone is a product of apple inc.", two concepts may be detected: "iphone" and "apple". However, the word "apple" may have two kinds of concepts associated with it: a fruit and a company. In this case, the context information (e.g. "iphone") of the word "apple" can be analyzed to further determine that "apple" in this sentence represents the company.

At block 202, after concepts are detected in each sentence, relevance measures between the sentences are computed according to the detected concepts. According to an example of the present disclosure, relevance measures between the sentences are computed according to the reference concepts (e.g. Wikipedia concepts) in said concept library corresponding to the detected concepts. At block 203, a concept-aware graph is constructed, wherein a node in said graph represents a sentence in the document and an edge between two nodes represents the computed relevance measure between these two sentences. As described before, after the concept-aware graph is constructed, some ranking method can be run on the graph to rank the sentences and then some post-processing operations such as removing very similar sentences can be performed and finally a summary is generated by choosing a number of top ranking sentences.

Figure 3:
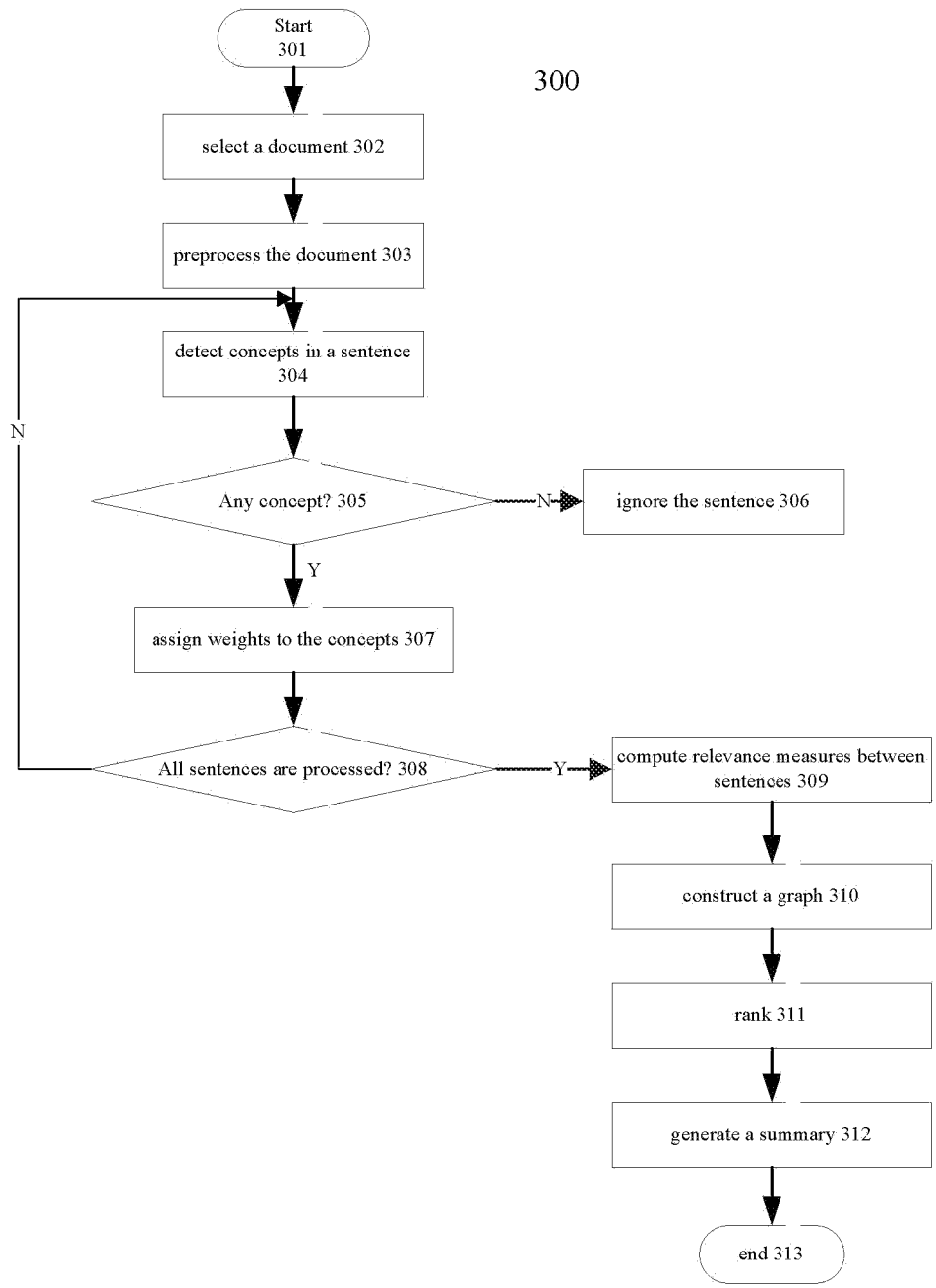
FIG. 3 is a more detailed process flow diagram for a method of summarizing a document according to an example of the present disclosure.

With reference to FIG. 3 now, FIG. 3 illustrates a more detailed process flow diagram for a method of summarizing a document according to an example of the present disclosure. The method is generally referred to by the reference number 300. The method 300 starts at block 301. At block 302, a document to be summarized is selected. This document can be input by a user or can be from a searching result. At block 303, the document is preprocessed. For example, illegal words and interjections are removed from the document. At block 304, a concept(s) is detected in each sentence of the document based on a predefined concept library such as Wikipedia, which includes a number of reference concepts such as Wikipedia pages. As described above, detecting a concept can involve obtaining concept candidates and disambiguation and will not be described in detail herein. At block 305, it is determined whether the current sentence contains any concept or not. If no concept is detected in a sentence, then this sentence will be ignored, as shown at block 306. At block 307, if concepts are detected in a sentence, then respective weights are assigned to the detected concepts. According to an example of the present disclosure, a weight represents a degree of similarity between the detected concept and its corresponding reference concept in the concept library. The weight can be a value ranging from 0 to 1, for example.

Taking Wikipedia for example. Suppose that the sentence being processed is "On Oct. 31, 1999, a plane carrying 217 mostly Egyptian passengers crashed into the Atlantic Ocean off Massachusetts". The results obtained by detecting concepts in this sentence with the use of Wikipedia can be:

<DetectedTopic id="698" title="Atlantic Ocean" weight="0.909"/>
<DetectedTopic id="1645518" title="Massachusetts" weight="0.807"/>
<DetectedTopic id="34553" title="1999" weight="0.678"/> wherein, the "title" represents the title of a Wikipedia page, the "DetectedTopic id" represents an indexing id of this Wikipedia page, and the "weight" represents a degree of similarity between the detected concept in the sentence and a corresponding Wikipedia page.

In this way, a sentence $S_i$ can be expressed by a vector: $S_i = \{C_{ik}:\text{Score}_{ik}\}$, wherein $S_i$ represents the $i^{th}$ sentence in the document, $C_{ik}$ represents the $k^{th}$ concept detected in the $i^{th}$ sentence, which is a Wikipedia concept (i.e. article ID in Wikipedia); and $\text{Score}_{ik}$ represents its similarity value to the sentence $S_i$ (i.e. the weight). The above sentence then can be expressed in the following form:

$$S = \begin{Bmatrix} 698: 0.909 \\ 1645518: 0.807 \\ 34553: 0.678 \end{Bmatrix}$$

Although not shown in FIG. 3, according to an example, a threshold can be set for the weights and if an weight assigned to a detected concept is less then said threshold, this detected concept is ignored. In an example, the threshold can be set to 0.6.

Then the method 300 proceeds from block 307 to block 308, where it is determined whether all the sentences are processed or not. If not, the method 300 returns to block 304. If all the sentences are processed, then the method 300 proceeds to block 309, where relevance measures between the sentences are computed according to the detected concepts. According to an example of the present disclosure, the relevance measure between two sentences is computed as a function of weights of concepts detected in these two sentences and relevance measures between reference concepts in said concept library corresponding to the detected concepts. In one example, a relevance measure between two reference concepts in said concept library is represented by the number of linked-in addresses shared by these reference concepts. Taking Wikipedia as an example of concept library again. If we search for two concepts "ipod" and "itouch" in Wikipedia, then we will get two Wikipedia pages related to these two concepts respectively and within these two pages there will be some common or shared linked-in addresses. For instance, a linked-in address of "Apple Inc." may be shared by these two pages. Of course, other shared linked-in addresses are possible. In this example, the number of these shared linked-in address can be used as a measure for relevance between these two Wikipedia concepts (i.e. reference concepts). According to an example, if there are two sentences $S_i$ and $S_j$, which are represented by a vector respectively, such as $S_i = \{C_{ik}:\text{Score}_{ik}\}$ and $S_j = \{C_{jl}:\text{Score}_{jl}\}$, then the above described function can be in the following form:

$$Rel(ij) = \sum_{kl} Score_{ik} Score_{jl} Rel(C_{ik} C_{jl})$$

wherein, Rel(ij) represents the relevance measure between two sentences $S_i$ and $S_j$, $\text{Rel}(C_{ik}C_{jl})$ represents the relevance between two Wikipedia concepts $C_{ik}$ and $C_{jl}$. Assuming that there are two concepts in sentence $S_i$ and three concepts in sentence $S_j$, then the above formula would become:

$\text{Rel}(i,j) = \text{score}_{i1}\text{score}_{j1}\text{Rel}(c_{i1}C_{j1}) + \text{score}_{i2}\text{score}_{j1}\text{Rel}(c_{i2}C_{j1}) + \text{score}_{i1}\text{score}_{j2}\text{Rel}(c_{i1}C_{j2}) + \text{score}_{i2}\text{score}_{j2}\text{Rel}(c_{i2}C_{j2}) + \text{score}_{i1}\text{score}_{j3}\text{Rel}(c_{i1}C_{j3}) + \text{score}_{i2}\text{score}_{j3}\text{Rel}(c_{i2}C_{j3})$ Taking the second term for example. $\text{Score}_{i2}$ is the weight of the second concept $c_{i2}$ in sentence i, $\text{score}_{j1}$ is the weight of the first concept $C_{j1}$ in sentence j and $\text{Rel}(c_{i2}C_{j1})$ is the number of linked-in addresses shared by these two Wikipedia concepts (i.e. wikipedia pages). Although Wikipedia is used in this example, those skilled in the art will appreciate that other concept library can be used as well and the relevance measure between two concepts or between two sentences can be defined accordingly without departing from the scope of the present invention.

The method 300 then proceed from block 309 to block 310, where a concept-aware graph is constructed, wherein each node in said graph represents a sentence in the document and an edge between two nodes represents the relevance measure between these two sentences computed in block 308. At block 311, after the concept-aware graph is constructed, some ranking method can be run on the graph to rank the sentences. At block 312, a summary can be generated by choosing a number of top ranking sentences. The method 300 ends at block 313.

By using the feature of concepts, examples of the present disclosure can help capture the semantic relationship between sentences, which is very hard, if not impossible, for the term-overlap-based methods to capture.

Figure 4:
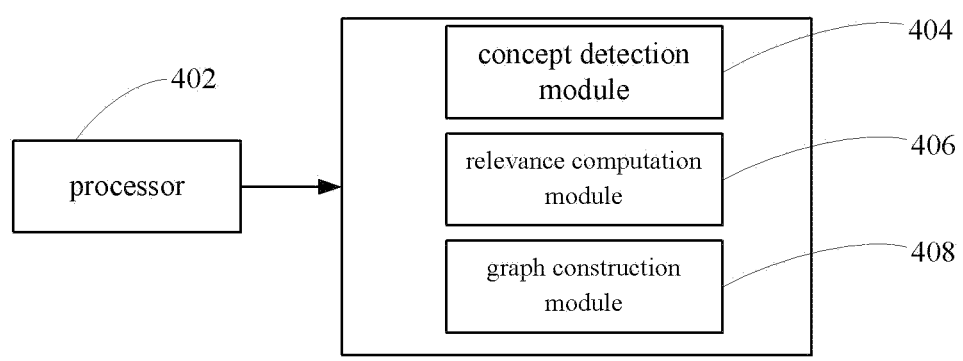
FIG. 4 is a block diagram showing a non-transitory, computer-readable medium that stores code for summarizing a document according to an example of the present disclosure.

With reference to FIG. 4 now, FIG. 4 is a block diagram showing a non-transitory, computer-readable medium that stores code for summarizing a document according to an example of the present disclosure. The non-transitory, computer-readable medium is generally referred to by the reference number 400.

The non-transitory, computer-readable medium 400 may correspond to any typical storage device that stores computer-implemented instructions, such as programming code or the like. For example, the non-transitory, computer-readable medium 400 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 402 generally retrieves and executes the computer-implemented instructions stored in the non-transitory, computer-readable medium 400 for summarizing a document. At block 404, a concept detection module detects a concept(s) in each sentence of said document. At block 406, a relevance computation module computes relevance measures between the sentences according to the detected concepts. At block 408, a graph construction module constructs a concept-aware graph so that a ranking method can be run on the graph to rank the sentences and generate a summary, wherein a node in said graph represents a sentence in the document and an edge between two nodes represents a relevance measure between these two sentences, as described above.

According to another example of the present disclosure, a system for summarizing a document is provided. The system comprises: a processor that is adapted to execute stored instructions; and a memory device that stores instructions. The memory device comprises processor-executable code, that when executed by the processor, is adapted to: detect, for each sentence in said document, a concept in said sentence; according to the detected concepts, compute relevance measures between the sentences; construct a concept-aware graph, wherein a node in said graph represents a sentence in the document and an edge between two nodes represents a relevance measure between these two sentences.

The above examples can be implemented by hardware, software or firmware or a combination thereof. For example the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a 'processor' should thus be interpreted to mean 'one or more processors'. The processes, methods and functional modules may be implemented as machine readable instructions executable by one or more processors, hardware logic circuitry of the one or more processors or a combination thereof. Further the teachings herein may be implemented in the form of a software product. The computer software product is stored in a storage medium and comprises a plurality of instructions for making a computer device (which can be a personal computer, a server or a network device such as a router, switch, access point etc.) implement the method recited in the examples of the present disclosure.

From the above depiction of the implementation mode, the above examples can be implemented by hardware, software or firmware or a combination thereof. For example the various methods, processes, modules and functional units described herein may be implemented by a processor (the term processor is to be interpreted broadly to include a CPU, processing unit, ASIC, logic unit, or programmable gate array etc.) The processes, methods and functional units may all be performed by a single processor or split between several processors. They may be implemented as machine readable instructions executable by one or more processors. Further the teachings herein may be implemented in the form of a software product. The computer software product is stored in a storage medium and comprises a plurality of instructions for making a computer device (which can be a personal computer, a server or a network device, etc.) implement the method recited in the examples of the present disclosure.

The figures are only illustrations of an example, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

The invention claimed is:

1. A method for summarizing an electronic document, comprising:
    detecting via a processor, for each sentence in said document, a concept in said sentence;
    associating, via the processor, each detected concept with a weight, wherein said weight represents a degree of similarity between the detected concept and its corresponding reference concept in a concept library available over the internet;
    representing, via the processor, each sentence with a vector comprising concept-weight pairs;
    according to the detected concepts, computing relevance measures between the sentences, wherein the relevance measures are based on a respective vector representation of each sentence;
    constructing a concept-aware graph, wherein a node in said graph represents each said sentence in the document and an edge between two nodes represents the relevance measure between two sentences represented by the two nodes;
    utilizing the concept-aware graph to rank the sentences in the document;
    summarizing the document by selecting representative sentences based on the ranks; and
    providing, via the processor, the summarized document to a user to enable the user to make a determination if the electronic document is to be downloaded from the internet.

2. The method of claim 1, wherein the detecting a concept in a sentence is performed based on a predefined concept library, which comprises a number of reference concepts.

3. The method of claim 2, wherein computing the relevance measures between the sentences comprises: computing said relevance measure according to reference concepts in said concept library corresponding to the detected concepts.

4. The method of claim 1, wherein computing the relevance measure between sentences comprises: computing said relevance measure as a function of weights of concepts detected in the sentences and relevance measures between reference concepts in said concept library corresponding to the detected concepts.

5. The method of claim 1, wherein the detected concept is included in the vector representation if the associated weight of the concept exceeds a threshold.

6. The method of claim 1, further comprising determining relevance scores between the detected concepts, and wherein the relevance measures between two sentences are based on the relevance scores between pairs of the detected concepts in the sentences.

7. A system for summarizing a document, the system comprising:
    a processor that is adapted to execute stored instructions; and
    a memory device that stores instructions, the memory device comprising processor-executable code, that when executed by the processor, is adapted to:
    detect, for each sentence in said document, a concept in said sentence;
    associate each detected concept with a weight, wherein said weight represents a degree of similarity between the detected concept and its corresponding reference concept in a concept library available over the Internet;
    represent each sentence with a vector comprising concept-weight pairs;
    according to the detected concepts, compute relevance measures between the sentences, wherein the relevance measures are based on a respective vector representation of each sentence;
    construct a concept-aware graph, wherein a node in said graph represents each said sentence in the document and an edge between two nodes represents the relevance measure between two sentences represented by the two nodes;

utilize the concept-aware graph to rank the sentences in the document; and summarize the document by selecting representative sentences based on the ranks.

8. The system of claim 7, wherein the code is to detect a concept in a sentence based on a predefined concept library, which comprises a number of reference concepts.

9. The system of claim 8, wherein the code is adapted to compute the relevance measures between the sentences by: computing said relevance measure according to reference concepts in said concept library corresponding to the detected concepts.

10. The system of claim 7, wherein the code is adapted to compute the relevance measure between the sentences by: computing said relevance measure as a function of weights of concepts detected in the sentences and relevance measures between reference concepts in said concept library corresponding to the detected concepts.

11. The system of claim 7, wherein the detected concept is included in the vector representation if the associated weight of the concept exceeds a threshold.

12. The system of claim 7, further comprising instructions adapted to determine relevance scores between the detected concepts, and wherein the relevance measures between two sentences are based on the relevance scores between pairs of the detected concepts in the sentences.

13. A non-transitory, computer-readable medium, comprising code to direct a processor to:

detect, for each sentence in a document which comprises a plurality of sentences, a concept in said sentence;

associate each detected concept with a weight, wherein said weight represents a degree of similarity between the detected concept and its corresponding reference concept in a concept library available over the internet;

represent each sentence with a vector comprising concept-weight pairs;

according to the detected concepts, compute relevance measures between the sentences, wherein the relevance measures are based on a respective vector representation of each sentence;

construct a concept-aware graph, wherein a node in said graph represents the sentence in the document and an edge between two nodes represents the relevance measure between two sentences represented by the two nodes;

utilize the concept-aware graph to rank the sentences in the document;

generate a summary for said document based on said ranked sentences; and provide the summarized document to a user to enable the user to make a determination if the electronic document is to be downloaded from the internet.

14. The non-transitory, computer-readable medium of claim 13, wherein the code to detect a concept in a sentence is based on a predefined concept library, which comprises a number of reference concepts.

15. The non-transitory, computer-readable medium of claim 13, wherein the detected concept is included in the vector representation if the associated weight of the concept exceeds a threshold.

16. The non-transitory, computer-readable medium of claim 13, wherein the code determines relevance scores between the detected concepts, and wherein the relevance measures between two sentences are based on the relevance scores between pairs of the detected concepts in the sentences.

* * * * *